(12) United States Patent
Hoelzle et al.

(10) Patent No.: US 12,707,267 B2
(45) Date of Patent: Aug. 11, 2026

(54) SPAM DETECTION AND MESSAGE TAGGING IN TELECOMMUNICATIONS NETWORKS

(71) Applicant: T-Mobile USA, Inc., Bellevue, WA (US)

(72) Inventors: Sean P. Hoelzle, Collegeville, PA (US); Clint Hammond, Burleson, TX (US)

(73) Assignee: T-Mobile USA, Inc., Bellevue, WA (US)

(*) Notice: Subject to any disclaimer, the term of this patent is extended or adjusted under 35 U.S.C. 154(b) by 355 days.

(21) Appl. No.: 18/490,693

(22) Filed: Oct. 19, 2023

(65) Prior Publication Data

US 2025/0133403 A1 Apr. 24, 2025

(51) Int. Cl.
*H04W 12/128* (2021.01)
*H04W 4/14* (2009.01)

(52) U.S. Cl.
CPC ........... *H04W 12/128* (2021.01); *H04W 4/14* (2013.01)

(58) Field of Classification Search
CPC .................................................. H04W 12/128
USPC .......................................................... 455/410
See application file for complete search history.

(56) References Cited

U.S. PATENT DOCUMENTS 9,060,253 B2 6/2015 Cooper et al.
10,498,678 B2 12/2019 Murtagh et al.
10,498,679 B2 12/2019 Istrati et al.
2006/0053203 A1* 3/2006 Mijatovic ............. H04L 51/212 709/206
2011/0289169 A1* 11/2011 Lee ...................... G06Q 10/107 709/206
2019/0349400 A1* 11/2019 Bruss ..................... G06N 20/00
2021/0112418 A1* 4/2021 Viegas .................. H04W 12/66
2023/0403559 A1* 12/2023 Ranganathan ......... G06N 3/045

FOREIGN PATENT DOCUMENTS

EP 2720416 A1 4/2014
EP 2250826 B1 11/2018

* cited by examiner

*Primary Examiner* — Michael R Neff

(74) *Attorney, Agent, or Firm* — Ashurst Perkins Coie US LLP

(57) ABSTRACT

The invention relates to tagging messages on a telecommunications network to convey, to the receiving device, information regarding the message, such as potential malicious nature and intent. In an example, a telecommunications network node receives a request to transmit an SMS message from a first mobile device to a second mobile device. The telecommunications network node uses a fraud detection module to determine a likelihood of harm, an extent of possible damage and a category of the SMS message. Using the output of the fraud detection module, the telecommunications network node ascribes to the SMS message a message modification attribute value, for example a TP-PID value. The modified message is transmitted to the second mobile device, where it is displayed with a warning.

20 Claims, 8 Drawing Sheets

Figure 2:
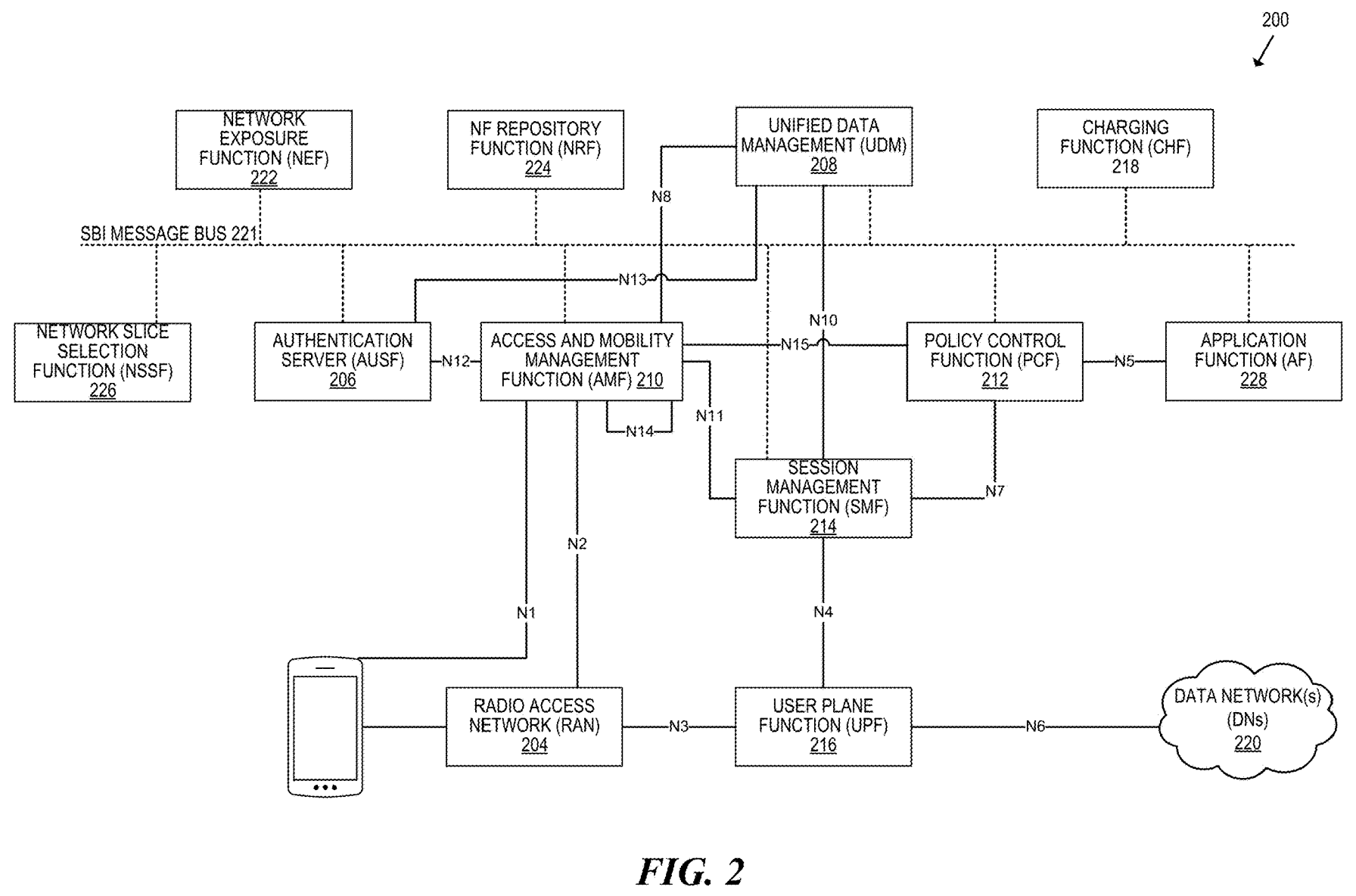

200

CHARGING FUNCTION (CHF) 218

APPLICATION FUNCTION (AF) 228

DATA NETWORK(s) (DNs) 220

UNIFIED DATA MANAGEMENT (UDM) 208

POLICY CONTROL FUNCTION (PCF) 212

SESSION MANAGEMENT FUNCTION (SMF) 214

USER PLANE FUNCTION (UPF) 216

NF REPOSITORY FUNCTION (NRF) 224

ACCESS AND MOBILITY MANAGEMENT FUNCTION (AMF) 210

RADIO ACCESS NETWORK (RAN) 204

NETWORK EXPOSURE FUNCTION (NEF) 222

AUTHENTICATION SERVER (AUSF) 206

NETWORK SLICE SELECTION FUNCTION (NSSF) 226

SBI MESSAGE BUS 221

| 0 | Default store and forward short message | 56~62 | SC-specific; usage based on mutual agreement between the SME and the SC |
|---|---|---|---|
| 1~31 | no telematic interworking, but SME to SME protocol | 63 | A GSM/UMTS mobile station. |
| 32 | implicit telematic device | 64 | Short Message Type 0 |
| 33-35 | Telex or telefax | 65-71 | Replace Short Message |
| 36 | Voice telephone | 72 | Device Triggering Short Message |
| 37 | ERMES (European Radio Messaging System) | 73~93 ← 424 | Reserved |
| 38 | National Paging system (known to the SC) | 94 | Enhanced Message Service (Obsolete) |
| 39 | Videotex (T.100 [20] /T.101 [21]) | 95 | Return Call Message |
| 40-44 | Teletex, carrier unspecified | 96~123 ← 426 | Reserved |
| 45 | UCI (Universal Computer Interface, ETSI DE/PS 3 01 3) | 124 | ANSI-136 R-DATA |
| 46~47 | Reserved | 125 | ME Data download |
| 48 | A message handling facility (known to the SC) | 126 | ME De personalization Short Message |
| 49 | Any public X.400 based message handling system | 127 | (U)SIM Data download |
| 50 | Internet Electronic Mail | 128~191 | reserved |
| 422 → 51~55 | Reserved | 192~255 | Assigns bits 0 5 for SC specific use |

*FIG. 4C*

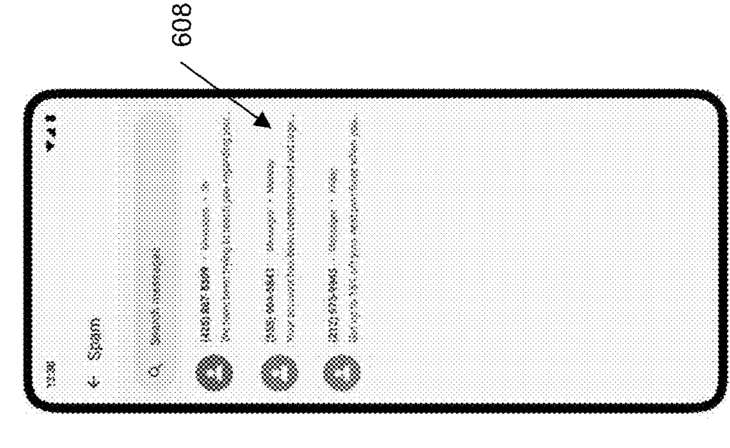
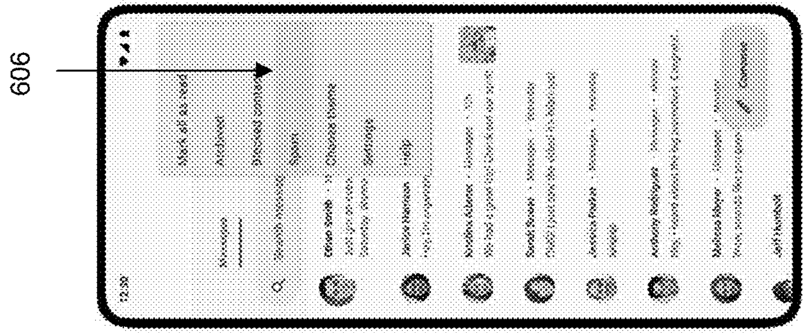
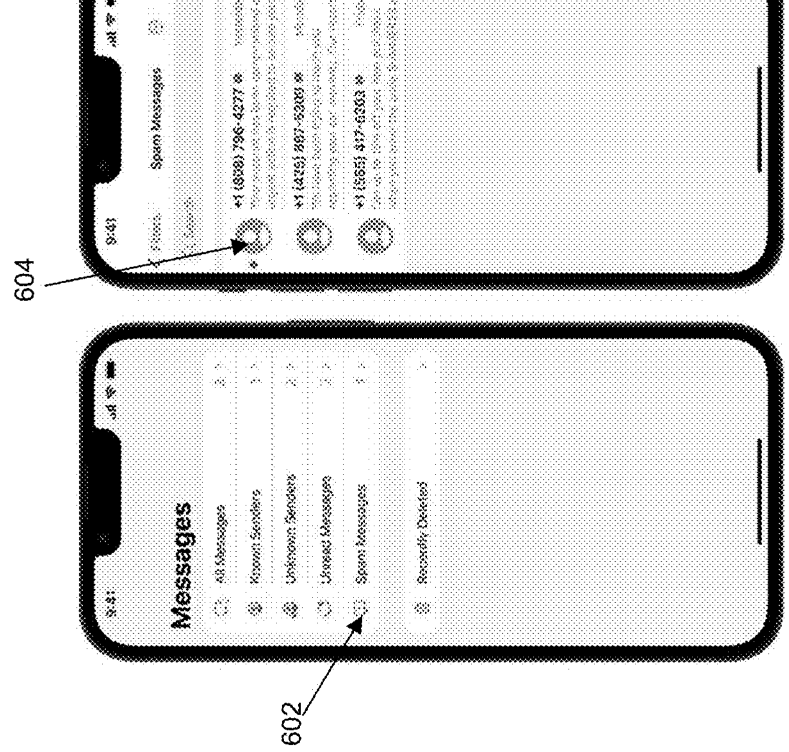
FIG. 6

SPAM DETECTION AND MESSAGE TAGGING IN TELECOMMUNICATIONS NETWORKS

BACKGROUND

As the popularity of mobile phones has surged, frequent users of text messaging have seen an increase in the number of unsolicited (and generally unwanted) commercial advertisements being sent to their telephones through text/multimedia messaging. This can be particularly annoying for the recipient because, unlike in email, some recipients may be charged a fee for every message received, including spam messages. Phishing through text messaging and SMS spam also became more prevalent and sophisticated. Fighting SMS spam is complicated by several factors, including the limited availability of mobile phone spam-filtering software.

BRIEF DESCRIPTION OF THE DRAWINGS

Detailed descriptions of implementations of the present invention will be described and explained through the use of the accompanying drawings.

FIG. 2 is a block diagram that illustrates 5G core network functions (NFs) that can implement aspects of the present technology.

FIG. 4C is a table demonstrating value ranges and corresponding use cases for TP-PID values.

FIG. 6 illustrates sorting tagged SMS and MMS messages into designated inboxes on the receiving device.

Figure 1:
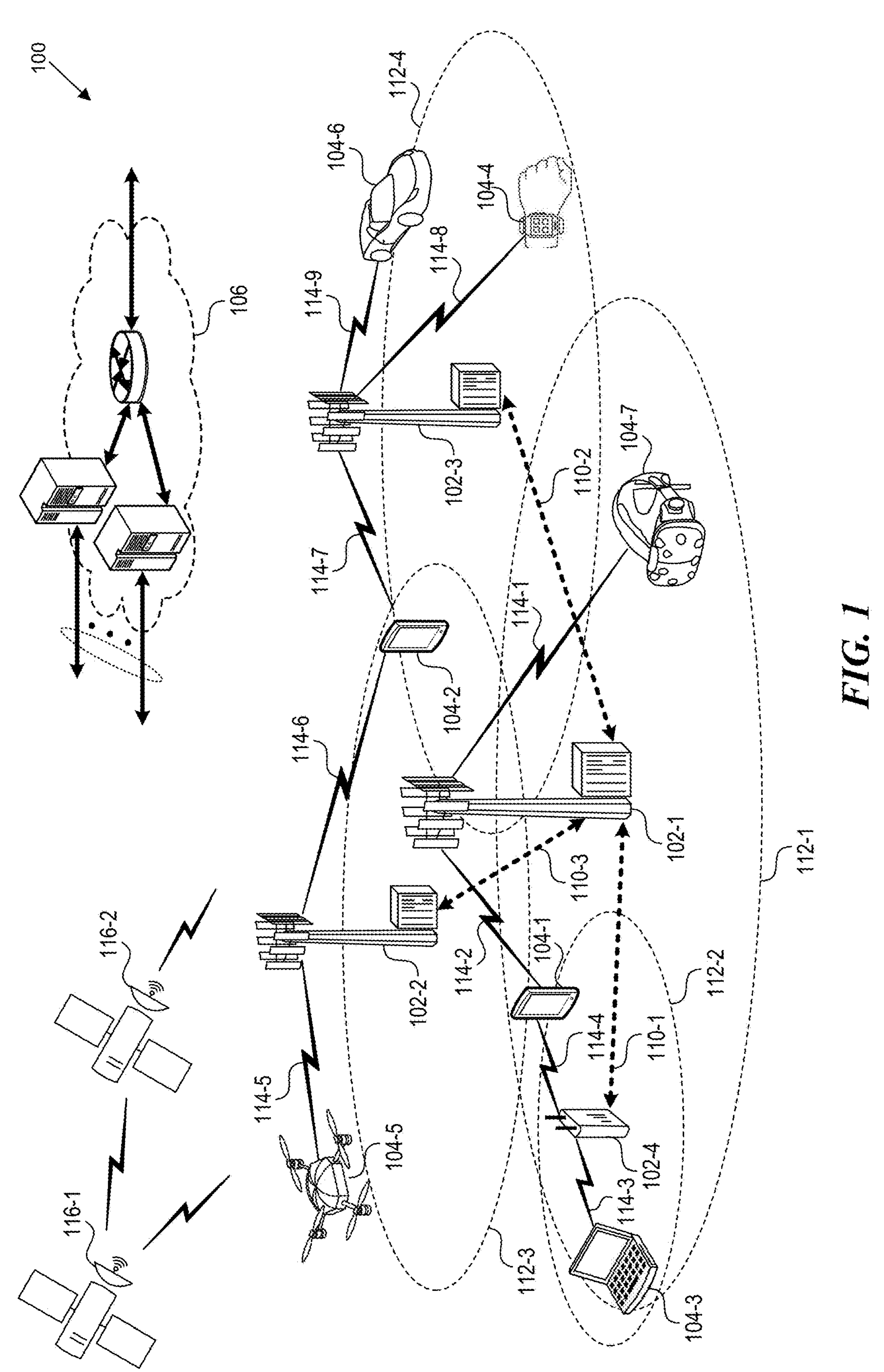
FIG. 1 is a block diagram that illustrates a wireless communications system that can implement aspects of the present technology.

The technologies described herein will become more apparent to those skilled in the art from studying the Detailed Description in conjunction with the drawings. Implementations or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The invention relates to tagging messages in a telecommunications network to convey to the receiving device information regarding the message, such as potential malicious intent. In an example, a telecommunications network node receives a request to transmit an SMS message from a first mobile device to a second mobile device. The telecommunications network node uses a fraud detection module to determine a likelihood of harm, an extent of possible damage, and/or a category of the SMS message. Using the output of the fraud detection module, the telecommunications network node ascribes to the SMS message a message modification attribute value, for example a TP-PID value. The modified message is transmitted to the second mobile device, where it may be processed, by outputting a notification, such as by displaying a warning.

Currently, mobile devices receiving unwanted or malicious mail like spam or phishing messages do not automatically filter or block such messages before presenting the messages to a user. If such messages could be flagged as dangerous or untrustworthy before transmission to a receiving mobile device, for example by a telecommunications network node, the receiving mobile device may filter out or differently display undesirable messages. In addition, if the message could be modified with granular information such as the category and expected severity of harm of the message, the receiving mobile device can more accurately generate/take an appropriate response. The invention herein, using the novel approach of tagging SMS and MMS messages with message modification attribute values that indicate the nature of a message to a receiving device, provides the benefit of accurate classification of messages to protect users of mobile devices from unwanted or harmful messages.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

The invention disclosed herein relates to tagging messages on a telecommunications network to convey additional information regarding the message to a receiving device. For example, a node of a telecommunications network receives a request to deliver a message from a first device to a second device. A fraud detection module can determine a spam likelihood indicator for the message, corresponding to a probability that the message is malicious or presents a security risk. Based on the spam likelihood indicator, the node can modify a message attribute value, for example a TP-PID value. The message modification attribute value is be formatted to be decipherable to the second device and can indicate a classification of the message into one of spam message, phishing message, or benign message. The node transmits the modified message to the second mobile device. The second device can, based on the message modification attribute value, determine a processing procedure for the message.

Figure 3:
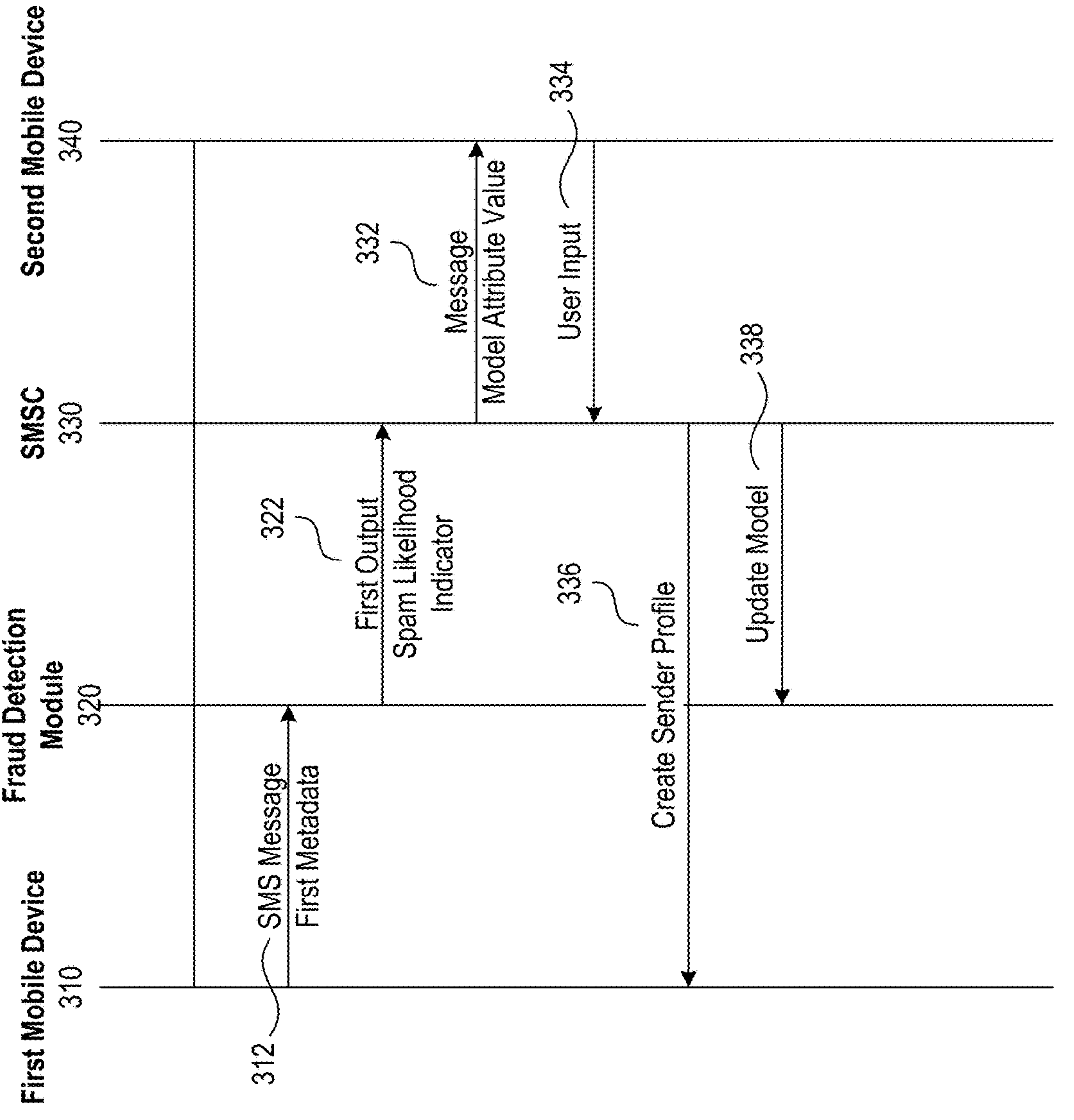
FIG. 3 is a flow diagram illustrating a process for identifying and tagging spam messages in a telecommunications network according to some implementations of the present technology.

FIG. 3 is a flow diagram indicating a set of telecommunications network nodes processing a message (e.g., a SMS message, a MMS message, etc.) from a first mobile device (e.g., First Mobile Device 310) to a second mobile device (e.g., Second Mobile Device 340). At operation 312, First Mobile Device 310 transmits a message via a telecommunications network, which routes the message to a network node comprising a Fraud Detection Module 320. The fraud detection module can access metadata associated with the message. The metadata includes a record of recent messages sent from the first mobile device, a location of the first mobile device when requesting to deliver the SMS message, a local time of the second mobile device, or a messaging history between the first mobile device and second mobile device. The metadata can be received from the first mobile device (e.g., in addition to the received message) and/or can be access from a remote data storage location (e.g., a message records database). Fraud Detection Module 320 can include a machine learning model trained to process input data to generate an output probability, for example a spam likelihood indicator. The machine learning model may be trained to use input data in the same format as the metadata, and can use an algorithm such as linear regression, neural networks, decision trees, naïve Bayes, and the like to process the input data to generate a predicted likelihood. In some implementations, Fraud Detection Module 320 can use a set of deterministic rules to transform the first metadata into the spam likelihood indicator. For example, Fraud Detection Module 320 can compare the spam likelihood indicator against a threshold probability to determine whether a SMS or MMS message is malicious. The spam likelihood indicator value can be indicative of whether the received message is a spam message, or whether the received message is a phishing attempt or other malicious content. In some implementations, Fraud Detection Module 320 outputs a category of harm in addition to the spam likelihood indicator to symbolize the nature of the SMS message.

At operation 322, Fraud Detection Module 320 can transmit the spam likelihood indicator and any corresponding category of harm to a telecommunications network node (e.g., SMSC 330). SMSC 330 may be a short messaging service center, which is capable of receiving, storing, modifying, routing, and forwarding SMS messages from mobile devices. In some implementations, SMSC 330 contains Fraud Detection Module 320 while in other implementations SMSC 330 communicates with Fraud Detection Module 320. SMSC 330 or an equivalent Multimedia Message Service Center (MMSC) can generate a message modification attribute value using the spam likelihood indicator value determined by Fraud Detection Module 320. For example, SMSC 330 can compare the spam likelihood indicator value against a threshold probability value to determine the severity/likelihood of the SMS message being spam, fraudulent, or the like. Based on the comparison, SMSC 330 can assign the SMS message to a predefined TP-PID value symbolizing the severity of the SMS message. Similarly, a MMSC can assign a MMS message a X-MMS-Message-Class in the header of the message, indicating a severity of the MMS message.

A TP-PID value may be a real number represented using eight bits. For example, a TP-PID value can be divided into three value segments: the first value segment is the first two bits, the second value segment is the next three bits, and the third value segment is the last three bits. The first value segment can indicate whether the SMS message is malicious, the second value segment can indicate a category of harm associated with the SMS message, if any, and the third value segment can indicate a severity of harm associated with the SMS message, if any. The category of harm, as indicated by the second value segment, can be a predetermined list of categories. For example, phishing, commercial spam, personal spam, general fraud, and identity theft attempt are all categories of harm. Alternatively, the category of harm indicates that the SMS message came from a trustworthy source or that its content is likely safe. For example, SMSC 330 can determine, based on the output of Fraud Detection Module 320, that the SMS message came from a trusted source such as a registered 10 Digit Long Code. The category of harm indicated by the TP-PID value thus represents an assessment of safety, and can take on a value of 0, for example. Conversely, if Fraud Detection Module 320 determines a message is from a source impersonating an institution and is using a non-registered 10 Digit Long Code, SMSC 330 may label the message as a scam using the category of harm in the TP-PID value. A severity of harm as indicated by the third value segment may be a real number from a scale of real numbers. A higher real number used to represent the severity of harm can indicate greater expectations of negative consequences (or vice versa). For example, a message determined to be an identity theft attempt from a known fraudulent source is determined as a high severity of harm and is therefore represented with a large number for the third value segment. A message determined to be personal spam, on the other hand, is represented with a smaller number for the third value segment.

In some embodiments, the telecommunications network node is a MMSC (multimedia messaging service center) instead of a short messaging service center when the received message is a multimedia message (MMS) instead of a text message (SMS). The MMSC performs similar operations as the SMSC as described above. The MMSC can receive, store, modify, route, and forward MMS messages from mobile devices. The MMSC can generate a message modification attribute value using the spam likelihood indicator value determined by Fraud Detection Module 320. For example, the MMSC can compare the spam likelihood indicator value against a threshold probability value to determine the severity/likelihood of the MMS message being spam, fraudulent, or the like. Based on the comparison, the MMSC can assign the MMS message to a predefined X-MMS-Message-Class. The X-MMS-Message-Class is a message modification attribute value, and the determination of which values the MMSC assigns to MMS messages is described below. The MMSC then transmits the MMS message to the receiving device with the X-MMS-Message-Class as a value included in the MM1 notification sent to the receiving device. The receiving device thus uses the X-MMS-Message-Class to determine whether to automatically retrieve the MMS message, to retrieve the MMS message and display with a warning, or to reject the MMS message.

At operation 332, SMSC 330 modifies the SMS message using the generated message modification attribute value. For example, it can update the TP-PID value of the SMS message. In some implementations, the message may be an MMS message, and SMSC 330 or an equivalent telecommunications network node updates a header of the MMS message to a message modification attribute value, which may be a X-MMS-Message-Class. SMSC 330 then transmits the modified message to Second Mobile Device 340. For example, using a user profile of the second mobile device in combination with the spam likelihood indicator of the SMS message, SMSC 330 can determine to send the modified message to a spam folder. In another example, the user profile of the Second Mobile Device 340 may cause the message received from SMSC 330 to display with a warning notification. The user profile may indicate preferred treatments of certain types of messages on Second Mobile Device 340.

In some implementations, SMSC 330 may store or retrieve user profiles associated with mobile devices while communicating with the mobile devices. In other implementations, SMSC 330 can create user profiles corresponding to mobile devices in response to receiving user input from the second mobile device of blocking and reporting the SMS message at operation 334. Additionally, using such user input, SMSC 330 can create a sender profile associated with First Mobile Device 310 at operation 336. At operation 338, the sender profile may be transmitted to Fraud Detection Module 320 for use as training data.

Figure 4A:
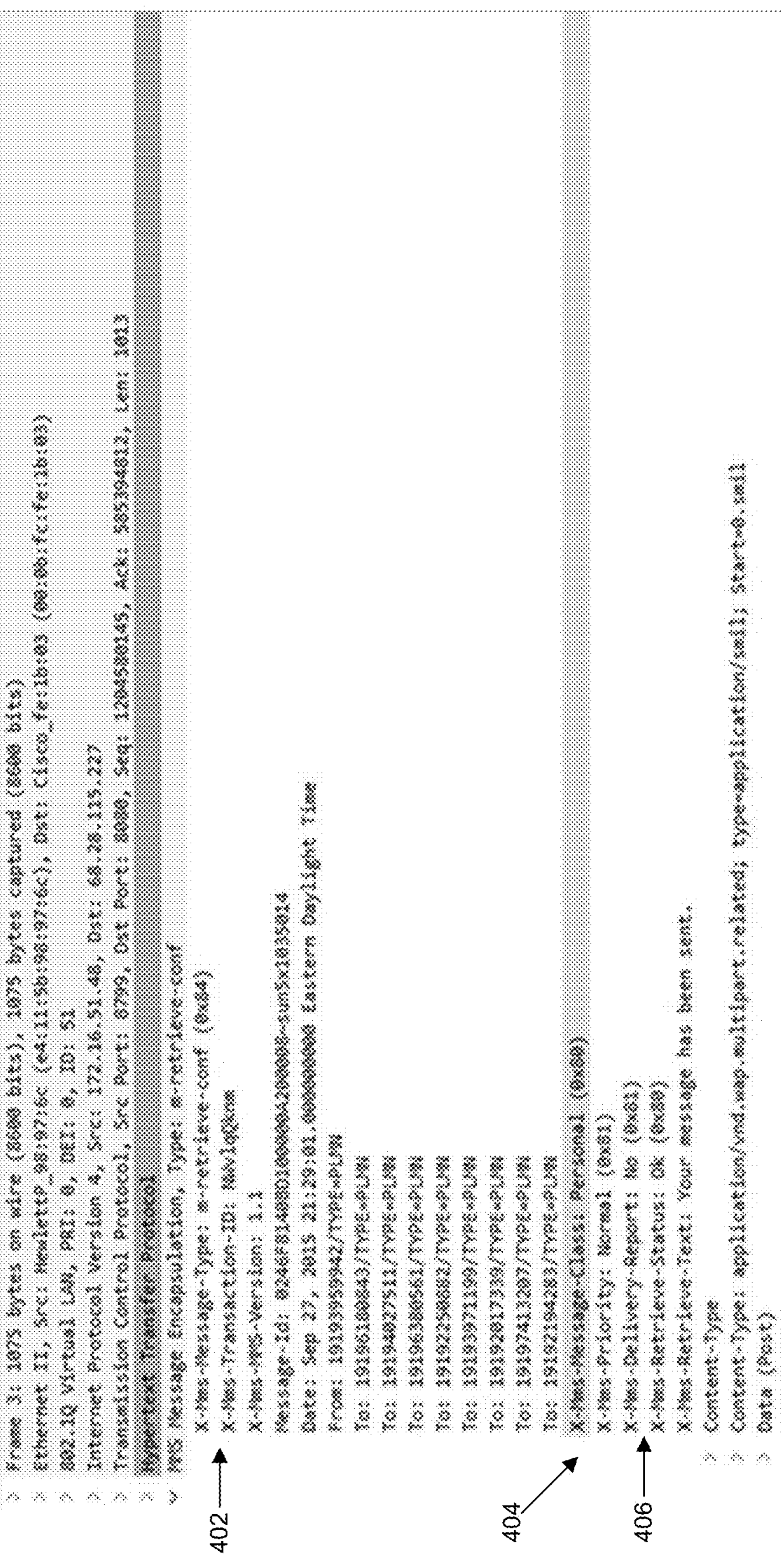
FIG. 4A illustrates an MMS message header, demonstrating a possible modification to a type of message where the present invention is applicable.

FIG. 4A illustrates an example data structure for data and metadata relating to an MMS message, exemplifying some of the messages sent from First Mobile Device 310 to Second Mobile Device 340. The metadata and its structure may be referred to as a header of an MMS message. The MMS message contains, in addition to the contents of the message, various metadata symbolizing the method of transmission, locations and times for sending and receiving the message, intended recipients, a nature of the message, a type of content including whether text or picture content is in the message, and a delivery status. For example, the metadata can indicate the message is transmitted using ethernet or a virtual LAN under Internet Protocol version 4, and includes a source address, a destination address, and a Transmission Protocol acknowledgement. For example, Metadata Section 402 contains some metadata under the MMS message encapsulation category. For example, Metadata Section 402 contains X-MMS-Message-Type, specifying a protocol data unit type. Metadata Section 402 also contains X-MMS-Transaction-ID, specifying a protocol data unit identification, and X-MMS-Version, specifying a multimedia messaging services protocol version. Other related metadata include a message ID unique to the message, a date and time of the message being submitted to the protocol data unit, a sending device, and one or more receiving devices. Metadata 404 is an X-MMS-Message-Class, which SMSC 330 can use to adjust a message modification attribute value. For example, the message modification attribute value for Metadata 404 can take one of four classes: personal, advertisement, information, or auto. Each of the classes may be represented using their class name as well as a real value, in base 10 or base 2. For example, personal is Octet 128, advertisement is Octet 129, informational is Octet 130, and Auto is Octet 131. In other implementations, the message modification attribute value for Metadata 404 can be from other classes: benign, scam, and phishing. Each of the classes may again be represented using their class name as well as a real value, in base 10, base 2, or the like. For example, metadata in base 2 for benign class can be represented as 00, scam as 01, and phishing as 11. In some implementations, the message modification attribute value for Metadata 404 indicates a severity in addition to a category of harm. For example, the severity is indicated as a real value displayed in conjunction with the category of harm. In the above example, the severity of harm can be displayed as four bits following the two bits of base 2 representation for the category of message. The mathematical magnitude of the representation reflects the expected harm, ranging from 0000 being completely innocuous to 1111 being the most dangerous. In some implementations, the severity of harm reflects or is considered alongside a degree of confidence by Fraud Detection Module 320 that the message belongs to the class. Subsequent to Metadata 404, where the message modification attribute value is applied, Metadata Section 406 captures additional information regarding the MMS message. Part or all of Metadata Section 406 may be available only after the message is delivered. Metadata Section 406 includes a priority level, an X-SMS-Delivery-Report, an X-SMS-Retrieve-Status, an X-SMS-Retrieve-Text, and a content type. Metadata Section 406 pertains to the delivery of the MMS message, and additionally indicates the medium of content in the MMS message.

Figure 4B:
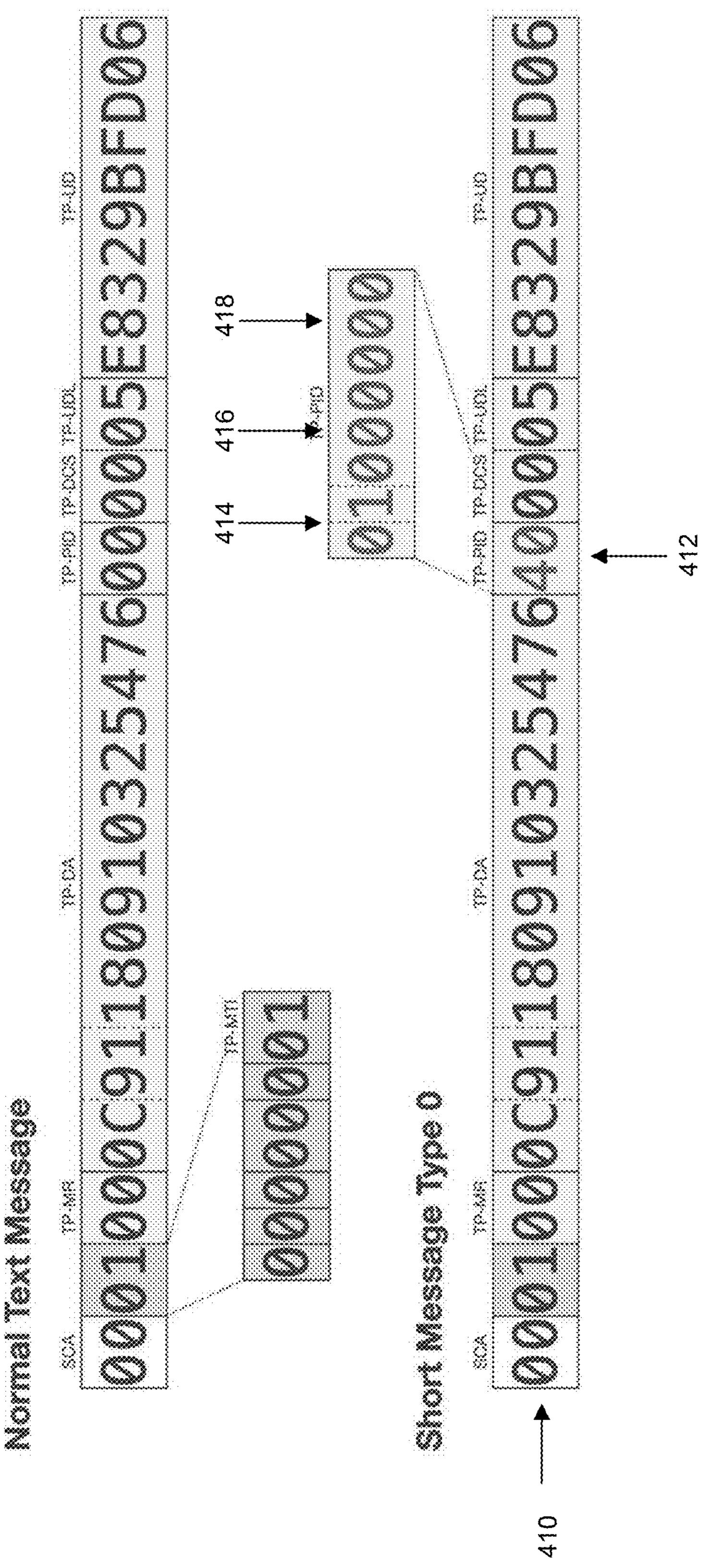
FIG. 4B illustrates a TP-PID on an SMS message, demonstrating a possible modification to a type of message where the present invention is applicable.

FIG. 4B illustrates the structure of an SMS message, a type among the messages sent from First Mobile Device 310 to Second Mobile Device 340. An exemplary breakdown of metadata for SMS Message 410 is shown, consisting of various portions such as the SCA, the TP-MR, the TP-DA, the TP-DCS, the TP-UDL, and the TP-UD. SMS Message 410 also includes TP-PID 412, which is a protocol identifier consisting of 8 bits. TP-PID 412 is used to convey a variety of information relating to the nature of the SMS message, and is used to ascribe a message modification attribute value by SMSC 330. The 8-bit representation of a TP-PID value in base 2 is used to indicate a category and severity of an SMS messaging using three components: Segment 414, Segment 416, and Segment 418. For example, Segment 414 is the first two bits and indicates whether the SMS message is malicious, Segment 416 is the next three bits and indicates a category of harm associated with the SMS message, if any, and Segment 418 is the last three bits and indicates a severity of harm associated with the SMS message, if any. For example, 00 in Segment 414 may indicate the message is strongly believed to be innocuous, and consequently Segment 416 and Segment 418 are both set to 000 to indicate a lack of potential danger. In another example, Segment 414 may be set to 11 to indicate a high degree of belief in potential negative consequences in the SMS message. Segment 416 may be set to 010 to indicate the SMS message is believed to be a scam, and Segment 418 may be set to 011 to indicate a relatively severe consequence if the user were to be affected by the message. A receiving device (e.g., Second Mobile Device 350) can, upon receiving the SMS message, parse the TP-PID value to receive the information in the above examples. Using user profile settings stored in memory, Second Mobile Device 350 can react to the received information, for example by blocking the SMS message, or displaying a warning notification.

FIG. 4C illustrates ranges of TP-PID values and corresponding meanings. The values are shown in base 10 real numbers, which are equivalent to 8-bit base 2 representations. Certain values or ranges of values carry meaning regarding the type of communication in a message to which the TP-PID value is attached. For example, a value of 95 indicates a return call message. Of particular note are value ranges not currently in use by standard telecommunications network protocols, indicated as "reserved" in descriptions on FIG. 4C. In some implementations, the invention uses some value ranges and corresponding 8-bit representations as message modification attribute values. For example, the invention can use Range 422 to indicate a first type of message, Range 424 for a second type of message, and Range 426 for a third type of message. For example, the system can classify all possible messages into three groups according to their values in Segment 414, each group of which corresponds to one of Range 422, Range 424, and Range 426.

Computer System

Figure 5:
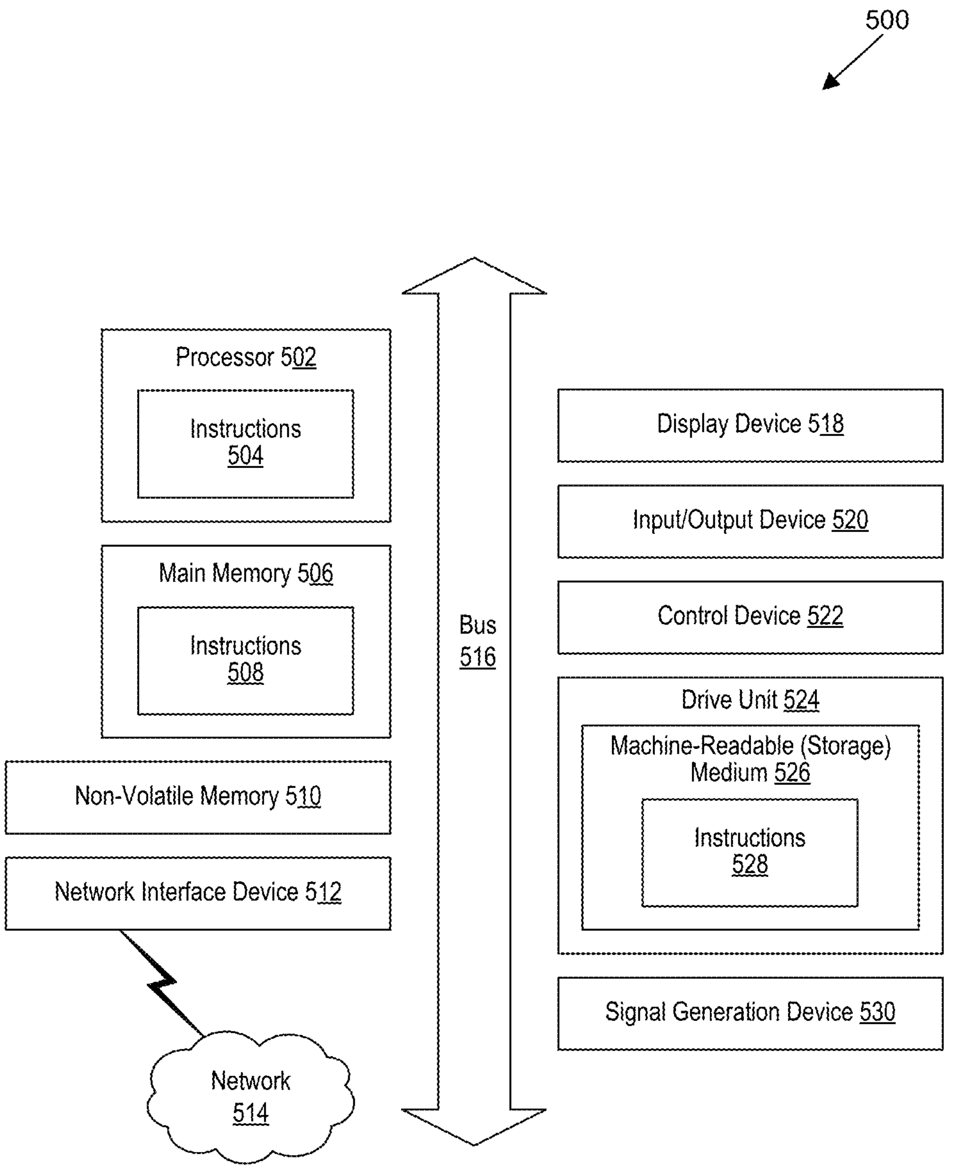
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 525 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 515 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium or computer-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 505, 508, 528) set at various times in various memory and storage devices in computing device(s). When read and executed by the processor 502, the instruction(s) cause the computing system 500 to perform operations to execute elements involving the various aspects of the disclosure.

FIG. 6 illustrates some example user interfaces generated/displayed at a receiving device responsive to receiving a SMS or MMS message that has been tagged with specific message modification attribute values. For example, upon receiving a SMS message with a TP-PID value that indicates a likely spam message, the receiving device can sort the SMS message into a designated folder, such as Folder 602 illustrated on FIG. 6. Folder 602 is displayed as "spam messages" in order to warn the user of the potential danger or undesirability of messages classified here. Displayed within Folder 602 are messages determined to be spam or otherwise potentially malicious or undesirable, and each message corresponds to a display flag such as Display Flag 604. Display Flag 604 can serve as a warning signal to the user, indicating the nature and severity of the message. The device can determine the display flag corresponding to a SMS message based on the SMS message's modification attribute value. For example, upon display, spam messages are assigned a blue flag such as Display Flag 604, whereas phishing messages can be assigned a red flag. In some embodiments, the device may choose to not automatically generate notifications for SMS and/or MMS messages tagged with certain message modification attribute values. For example, the device can silence all notifications for messages designated for the spam folder (e.g., Folder 602). Alternatively, the device can generate notifications to indicate that a message tagged as spam has been received, without displaying the contents of the message. If the user seeks out the message in Folder 602 or a similar spam folder, the message can be displayed with a warning such as Display Flag 604. User interface element 606 shows the option on some devices for the user to indicate/select a SMS and/or MMS message as spam. For example, the user opens a drop-down menu for a message and selects the option to mark it as spam. The device can record this user action and, for example, start to more frequently mark messages from the same source/sender as spam. Additionally or alternatively, the device can transmit this user action to a telecommunications network node such that the telecommunications network provider can create/update a user profile associated with the device. The user profile can influence future decisions on whether to label messages to the device as spam. In some embodiments, user interface element 606 is instead a drop-down menu where the user can access the spam folder, such as Folder 608. Folder 608 shows an alternate layout for the spam folder, where messages in Folder 608 are not displayed as unread. This has the benefit of protecting the user's privacy and mitigating potential harassment/harm from unwanted/unsolicited messages.

Remarks

The terms "example", "implementation" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A network node in a telecommunications network for tagging messages, the network node comprising a non-transitory computer-readable medium having instructions stored thereon, where the instructions when executed by one or more processors of the network node cause the network node to:

receive, at the network node of the telecommunications network, a request to deliver a Short Message Service (SMS) message from a first mobile device to a second mobile device;

processing first metadata associated with the SMS message to determine a spam likelihood indicator value for the SMS message, wherein the spam likelihood indicator value is indicative of whether the SMS message is a spam message;

generate, by the network node, a message modification attribute value using the spam likelihood indicator value;

modify the SMS message using the message modification attribute value to obtain a modified SMS message, wherein modifying the SMS message comprises updating a Transfer Protocol-Protocol Identifier (TP-PID) value of the SMS message to obtain an updated TP-PID value; and transmit, by the network node, the modified SMS message to the second mobile device.

2. The network node of claim 1, wherein the instructions further cause the one or more processors of the network node to:

receive, at the network node of the telecommunications network, a second request to deliver a Multimedia Messaging Service (MMS) message; and modify the MMS message by updating a header of the MMS message.

3. The network node of claim 1, wherein the first metadata comprises at least one of:

a record of recent messages sent from the first mobile device, a location of the first mobile device when requesting to deliver the SMS message, a local time of the second mobile device, or a messaging history between the first mobile device and the second mobile device.

4. The network node of claim 1, wherein processing the first metadata comprises generating a first output indicating a classification of the SMS message into one of a spam message, phishing message, or benign message.

5. The network node of claim 1, wherein the TP-PID value comprises:

a first value segment indicating whether the SMS message is malicious;

a second value segment indicating a category of harm associated with the SMS message, if any; and a third value segment indicating a severity of harm associated with the SMS message, if any.

6. The network node of claim 1, wherein the instructions further cause the one or more processors of the network node to:

using a user profile associated with the second mobile device, determine to send the modified SMS message to a spam folder associated with account of the second mobile device.

7. The network node of claim 1, wherein the instructions further cause the one or more processors of the network node to:

receive user input from the second mobile device comprising the SMS message being blocked and reported; and using the user input, create a user profile associated with the second mobile device.

8. The network node of claim 1, wherein the instructions further cause the one or more processors of the network node to:

receive user input from the second mobile device comprising the SMS message being blocked and reported;

using the user input, create a sender profile associated with the first mobile device; and transmit the sender profile.

9. The network node of claim 1, wherein the instructions further cause the one or more processors of the network node to:

using a mobile application on the second mobile device, display the SMS message with a warning notification, wherein the warning notification is based on the updated TP-PID value.

10. The network node of claim 1, wherein the instructions further cause the one or more processors of the network node to use the spam likelihood indicator value to determine the TP-PID value by:

comparing the spam likelihood indicator value against a threshold probability to determine a severity of the SMS message; and based on the comparing, assigning the SMS message to a predefined TP-PID value symbolizing the severity of the SMS message.

11. A method for tagging messages being communicated via a telecommunications network, the method comprising:

receiving, at a network node of the telecommunications network, a request to deliver a Short Message Service (SMS) message from a first mobile device to a second mobile device;

processing first metadata associated with the SMS message to determine a spam likelihood indicator value for the SMS message, wherein the spam likelihood indicator value is indicative of whether the SMS message is a spam message;

generating, by the network node, a message modification attribute value using the spam likelihood indicator value;

modifying the SMS message using the message modification attribute value to obtain a modified SMS message, wherein modifying the SMS message comprises updating a Transfer Protocol-Protocol Identifier (TP-PID) value of the SMS message; and transmitting, by the network node, the modified SMS message to the second mobile device.

12. The method of claim 11, further comprising:

using a user profile associated with the second mobile device, determining to send the modified SMS message to a spam folder.

13. The method of claim 11, wherein the first metadata comprises:

a record of recent messages sent from the first mobile device;

a location of the first mobile device when requesting to deliver the SMS message;

a local time of the second mobile device; and a messaging history between the first mobile device and the second mobile device.

14. The method of claim 11, further comprising:

receiving user input from the second mobile device comprising the SMS message being blocked and reported; and using the user input, creating a user profile associated with the second mobile device.

15. The method of claim 11, further comprising:

receiving user input from the second mobile device comprising the SMS message being blocked and reported;

using the user input, creating a sender profile associated with the first mobile device; and transmitting the sender profile.

16. The method of claim 11, further comprising:

using a mobile application on the second mobile device, displaying the SMS message with a warning notification, wherein the warning notification is based on the TP-PID value.

17. One or more non-transitory, computer-readable media storing instructions thereon, where the instructions when executed by a network node of a telecommunications network, perform operations for operating the network node, the operations comprising:

receiving, at the network node of the telecommunications network, a request to deliver a Short Message Service (SMS) message from a first mobile device to a second mobile device;

processing first metadata associated with the SMS message to determine a spam likelihood indicator value for the SMS message, wherein the spam likelihood indicator value is indicative of whether the SMS message is a spam message;

generating, by the network node, a message modification attribute value using the spam likelihood indicator value;

modifying the SMS message using the message modification attribute value to obtain a modified SMS message, wherein modifying the SMS message comprises updating a Transfer Protocol-Protocol Identifier (TP-PID) value of the SMS message; and transmitting, by the network node, the modified SMS message to the second mobile device.

18. The one or more non-transitory, computer-readable media of claim 17, wherein processing the first metadata comprises using a machine learning model to generate a first output comprising a probability of the SMS message being malicious.

19. The one or more non-transitory, computer-readable media of claim 17, wherein the TP-PID value comprises:

a first value segment indicating whether the SMS message is malicious;

a second value segment indicating a category of harm associated with the SMS message, if any; and a third value segment indicating a severity of harm associated with the SMS message, if any.

20. The one or more non-transitory, computer-readable media of claim 17, wherein the instructions further cause the network node to perform operations comprising:

using a mobile application on the second mobile device, displaying the SMS message with a warning notification, wherein the warning notification is based on the TP-PID value.

* * * * *